United States Patent [19]

Fukumoto et al.

[11] Patent Number: 4,905,532
[45] Date of Patent: Mar. 6, 1990

[54] POWER TRANSMITTING APPARATUS

[75] Inventors: Ryoichi Fukumoto, Nagoya; Shigeru Hayakawa, Chiryu; Nozomu Torii, Hekinan, all of Japan

[73] Assignee: Aisin Seiki Kabushiki Kaisha, Kariya, Japan

[21] Appl. No.: 250,579

[22] Filed: Sep. 29, 1988

[30] Foreign Application Priority Data

Sep. 30, 1987 [JP] Japan .................................. 62-245968
Sep. 30, 1987 [JP] Japan .................................. 62-245969

[51] Int. Cl.$^4$ .............................................. F16H 1/16
[52] U.S. Cl. ...................................... 74/425; 74/625; 185/40 R; 292/201
[58] Field of Search ...................... 74/425, 89.14, 625; 49/449; 292/201, 341.16; 185/40 R

[56] References Cited

U.S. PATENT DOCUMENTS 2,781,191  2/1957  Pickles ................................... 74/425
4,637,274  1/1987  Goldenfeld ........................... 74/625

FOREIGN PATENT DOCUMENTS 625474   3/1929  France .............................. 185/40 R
1116495  6/1968  United Kingdom .................. 74/425

OTHER PUBLICATIONS

Dudley, Darle W., *Gear Handbook*, 1962, pp. 2-11.

Primary Examiner—Leslie A. Braun
Assistant Examiner—Janice E. Chartoff
Attorney, Agent, or Firm—Finnegan, Henderson, Farabow, Garrett and Dunner

[57] ABSTRACT

A power transmitting apparatus is comprised of an electrically operated motor having a shaft which is rotatable in one or the other direction, a worm-gear provided at an outer periphery thereof with a geared portion at which an angle of load is established at a set value so as to be larger than an angle of friction and fixedly mounted on the shaft of the motor, a worm-wheel provided at an outer periphery thereof with a geared portion which is in mesh engagement with the geared portion of the worm-gear, and a lever operatively connected to the worm-wheel for transmitting the rotational torque therefrom to a driven member. Since an angle of load is set so as to be larger than an angle of friction in the worm-gear, the rotational torque may be transmitted between the worm-gear and the worm-wheel. So, flexibility in mechanical design is increased.

2 Claims, 3 Drawing Sheets

POWER TRANSMITTING APPARATUS

BACKGROUND OF THE INVENTION

1. Field of the Invention

The present invention relates to a power transmitting apparatus and more particulary to a power transmitting apparatus by which the rotational torque may be transmitted from a worm-gear to a worm-wheel and vice versa.

2. Description of the prior art

A conventional power transmitting apparatus includes an electrically operated motor with a shaft, a worm-gear fixedly mounted on the shaft of the motor, a worm-wheel meshed with the worm-gear, and a lever connected to the worm-wheel for transmitting the rotational torque to a driven member upon rotation of the worm-gear.

However, the worm-wheel is only rotated upon rotation of the worm-gear in the conventional power transmitting apparatus. So, the conventional power transmitting apparatus can not satisfy a request in design for transmitting the rotational torque from the lever to the worm-gear via the worm-wheel.

SUMMARY OF THE INVENTION

It is, therefore, a principal object of the present invention to provide a power transmitting apparatus without the aforementioned drawback.

Another object of the present invention is to provide a power transmitting apparatus by which the rotational torque may be transmitted from a worm-gear to a worm-wheel and vice versa.

According to the present invention, a power transmitting apparatus is comprised of an electrically operated motor having a shaft which is rotatable in one or the other direction, a worm-gear provided at an outer periphery thereof with a geared portion at which an angle of load is established at a set value so as to be larger than an angle of friction and fixedly mounted on the shaft of the motor, a worm-wheel provided at an outer periphery thereof with a geared portion which is in meshing engagement with the geared portion of the worm-gear, and a lever operatively connected to the worm-wheel for transmitting the rotational torque therefrom to a driven member.

In the present invention, since an angle of load is set so as to be larger than an angle of friction in the worm-gear, the rotational torque may be transmitted between the worm-gear and the worm-wheel.

BRIEF DESCRIPTION OF THE DRAWINGS

The above and other objects, features and advantages of the present invention will become apparent and more readily appreciated from the following detailed description of preferred exemplary embodiment of the invention, taken in connection with the accompanying drawings, in which.

The preferred embodiment will be explained hereinafter with reference to the drawings.

DETAILED DESCRIPTION OF THE PREFERRED EMBODIMENT

Figure 1:
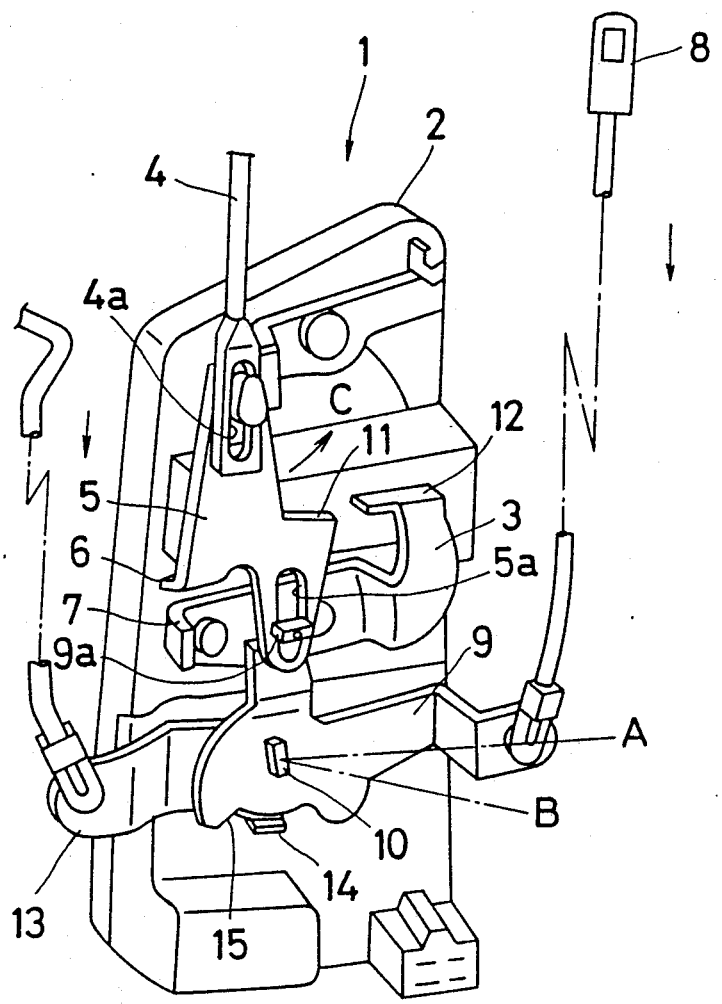
FIG. 1 is a front view of a door locking device to which the present invention is applied.

Referring now to FIGS. 1 through 4, a door locking device 1 includes a housing 2 to which a releasing lever 3 is pivoted. The releasing lever 3 is operatively connected to a pawl (not shown) which is engaged with or disengaged from a U-shaped striker (not shown) fixedly mounted to a door is well-known. The relationship between the pawl and the striker is determined by the rotation of the pawl due to the position of the releasing lever 3. Though the releasing lever 3 is so positioned that the pawl is in engagement with the striker under a condition as shown in FIG. 1, upon counter-clockwise rotation of the releasing lever 3, the pawl is disengaged from the striker. For rotating the releasing lever 3 in the counter-clockwise direction, an inside handle (not shown) or an outside handle (not shown) has to be manupulated. Upon manupulation of the inside or outside handle, a rod 4 is moved in the downward direction, a projection 6 of an opening lever 5 which is in sliding engagement with a slot 4a of the rod 4 is brought into abutment on a left end 7 of the releasing lever 3, thereby rotating the releasing lever 3 in the counter-clockwise direction.

A locking arm 9 is fixedly mounted on a pin 10 which is rotatably supported on the housing 2 and has a portion 9a which is in sliding engagement with a slot 5a of the opening lever 5. While the locking arm 9 is being positioned at a first position indicated by "A", downward movement of the opening lever 5 allows the engagement of the projection 6 thereof on the left end 7 of the releasing lever 3. However, upon push of a locking button 8 in the downward direction, a locking arm 9 which is fixedly mounted on a pin 10 is rotated in the clockwise direction and is positioned at a second position indicated by "B". Then, the opening lever 5 is brought into rotation in the counter-clockwise direction as indicated by "C", the projection 6 thereof is moved away from the left end of the releasing lever 7. Thus, each door is brought into the locked condition in which the pawl is prevented from moving away from the striker, thereby preventing unexpected door-opening during the vehicle-travel. Under such condition, upon downward unitary movement of the rod 4 and the opening lever 5 as a result of mistaken manipulation of the inside or the outside handle, non-engagement between the projection 6 of the opening lever 5 and the left end 7 of the releasing lever 3 is maintained, thereby holding latched condition between the pawl and the striker. Further, under this condition, since a projection 12 of the releasing lever 3 which is in counter-clockwise rotation is brought into engagement with a stepped portion 11 of the opening lever 5, thereby preventing further counter-clockwise rotation of the releasing lever 3. Thus, latched condition between the pawl and the striker is assured.

On the pin 10, there is rotatably mounted a key-operated lever 13 having a projection 14 which is fitted in a notch 15 formed at a periphery of the locking arm 9. The lever 13 is operatively connected to a key-cylinder (not shown) via a rod (not shown) so as to be operated by a key (not shown). Upon key operation, the key-operated lever 13 is rotated in the clockwise direction. Due to such rotation of the key-operated lever 13, the locking arm 9 which is moved together with the key-operated lever 13, is transferred from the first position A to the second position B for holding latched condition and vice versa for holding unlatched condition.

Figure 2:
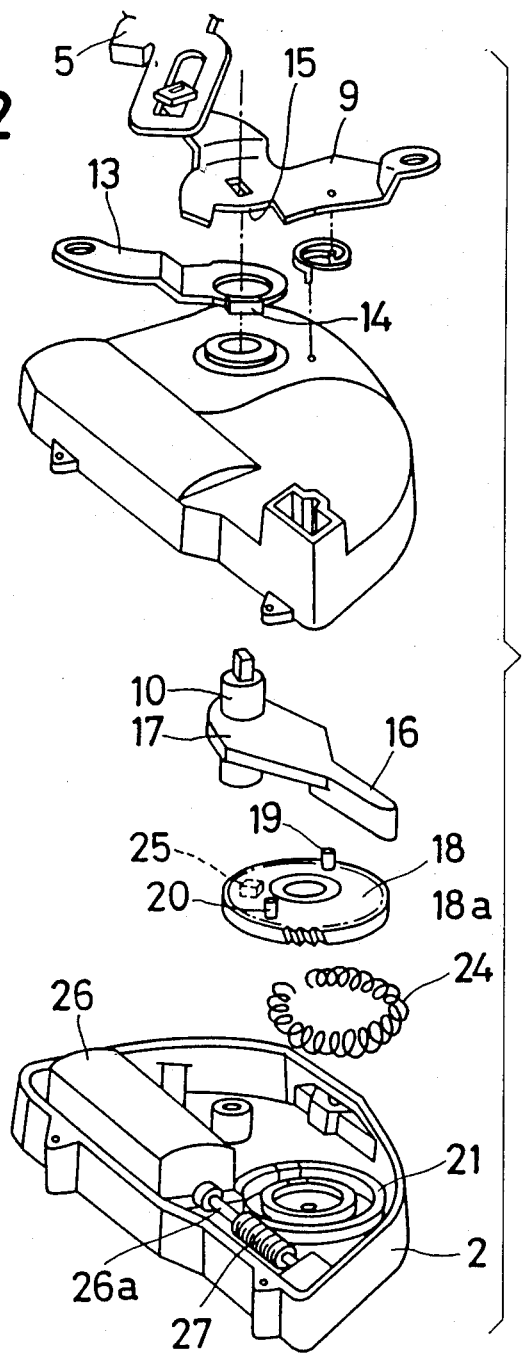
FIG. 2 is an exploded view of the door locking device shown in FIG. 1.
Figure 3:
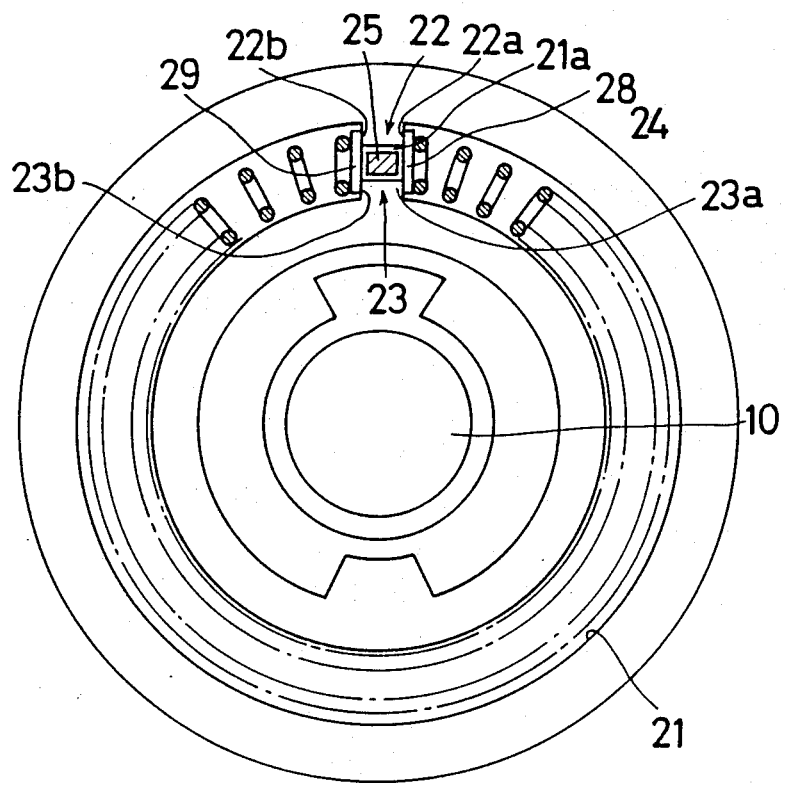
FIG. 3 is a plain view of a spring which urges a lever 1.
Figure 4:
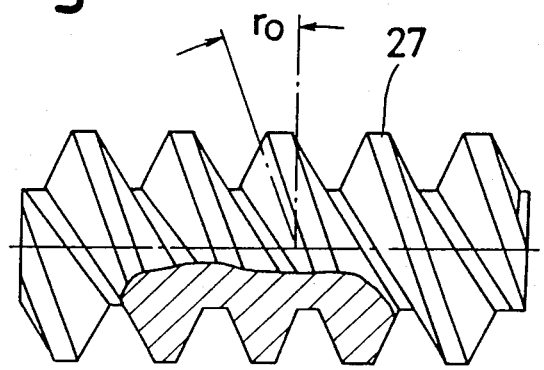
FIG. 4 is a front view of a worm-gear.

In addition to the above-mentioned manual operation, the transfer of the locking arm 9 is performed electrically. In detail, as best shown in FIG. 2, there is fixedly mounted an operating lever 17 with an extending arm 16. On the pin 10, there is rotatably mounted a worm-wheel 18 having at an outer periphery thereof a geared portion 18a. A pair of equally pitched projections 19 and 20 are formed on an upper surface of the worm-wheel 18 and the arm 16 is positioned above the upper surface of the worm-wheel 18.

In the housing 2, there is provided an annular groove 21 having at a portion thereof a narrowed portion or a space 21a defined by opposedly projected walls 22 and 23. An expanding spring 24 is accommodated in the groove 21. A right (left) end of the spring 24 is in abutment with a shoulder 22a (22b) of the wall 23 and a shoulder 23a (23b) of the wall 24 via retainer 28 (29). A prominence 25 is formed on a lower surface of the worm-wheel 18 and is extended into the space 21a enclosed by the wall 22, the wall 23, the retainer 28 and the retainer 29. Thus, when the worm-wheel 18 is rotated in the clockwise (counter-clockwise) direction in FIG. 3, the prominence 25 urges the retainer 28 (29), thereby pressing the spring 24. Clockwise (counter-clockwise) rotation of the worm-wheel 18 brings the engagement of the pin 19 (20) and the arm 16 of the operating lever 17 and successive unitary rotation of the operating lever 17 and the pin 10. Thus, the locking arm 9 is transferred from the first position A (the second position B) to the second position B (the first position A).

The worm-wheel 18 is in mesh engagement with a worm-gear 27 fixedly mounted on a shaft 26a of an electrically operated reversible motor 26. Rotation of the worm-wheel 18 depends upon the rotation of the shaft 26a of the motor 26. In general, when an angle of load $r_0$ is larger than an angle of friction $\phi$, the rotational torque may be transmitted to the worm-gear 27 from the worm-wheel 18. Thus, in the present invention, in light of the formula $\mu = \tan \phi$, both the worm-wheel 18 and the worm-gear 27 are made of cast iron having a coefficient of friction $\mu$ ranging about from 0.1 through 0.15 with resulting that $\phi$ ranging from 6.34° through 9.48°. Thus, by setting an angle of load in the worm-gear 27 at a value greater than 9.48°, the rotational torque may be transmitted from the worm-gear 27 to the worm-wheel 18. Due to such designation of an angle of load in the worm-gear 27, after rotation of the worm-wheel 18 in one direction by actuation of the motor 26, the worm-wheel 18 may be returned to its original position by subsequent manual operation for rotating the worm-wheel 18. Electrical operation for rotating the worm-wheel 18 may be performed, of course, immediately upon completion of manual operation for rotating the worm-sheel 18.

While the invention has been particularly shown and described with reference to preferred embodiment thereof, it will be understood by those skilled in the art that the foregoing and other changes in form and details can be made therein without departing from the spirit and scope of the invention.

What is claimed is:

1. A power transmitting apparatus comprising:
   an electrically operated motor having a shaft which is rotatable in opposite directions;
   a worm-gear provided at an outer periphery thereof with a geared portion at which an angle of load is established at a set value so as to be larger than an angle of friction and fixedly mounted on said shaft of said motor;
   a worm-wheel provided at an outer periphery thereof with a geared portion which is in mesh engagement with said geared portion of said worm-gear;
   a lever operatively connected to said worm-wheel for transmitting the rotational torque therefrom to a driven member; and
   a return mechanism for returning said worm-wheel to an original position after rotation of said worm-wheel, said return mechanism including an expanding spring, a guide means for accommodating said expanding spring, said guide means having a narrowed portion, a prominence formed on a lower surface of said worm-wheel and extended into said narrowed portion, and a pair of equally pitched projections formed on an upper surface of said worm-wheel, each of said projections being engagable with said lever after rotation of said worm-wheel.

2. A power transmitting apparatus according to claim 1, wherein said guide means is in the form of an annular groove.

* * * * *